United States Patent [19]

Chamberlain et al.

[11] Patent Number: 4,981,404

[45] Date of Patent: Jan. 1, 1991

[54] TENSION BOLT HAVING ADJUSTABLE STRESS LEVEL

[75] Inventors: Larry W. Chamberlain; Clarence M. Brown, Jr., both of Louisiana, Mo.

[73] Assignee: Arrow Support Systems Co., Eolia, Mo.

[21] Appl. No.: 421,651

[22] Filed: Oct. 16, 1989

[51] Int. Cl.⁵ ............................................. F16B 31/12
[52] U.S. Cl. ......................................... 411/14; 411/9; 73/761; 116/DIG. 34
[58] Field of Search ........................... 411/8, 9, 13, 14; 73/761; 116/212, DIG. 34

[56] References Cited

U.S. PATENT DOCUMENTS 3,248,923  5/1966  Blakeley ................................. 73/761
4,525,114  6/1985  Hirst ......................................... 411/9

FOREIGN PATENT DOCUMENTS 71676  6/1979  Japan ..................................... 73/761

Primary Examiner—Neill R. Wilson

[57] ABSTRACT

For anchoring heavy machinery to foundations, previously tensioned stress-level indicating bolt connectors are provided. In a top axial cavity of the connector, threads are provided to mount an angularly adjustable stress-level indicating pin. In use, when the design tension stress level is reached and the connector thereby extended, angular freedom or restraint of the gaging pin indicates that the pre-set stress has been reached or exceeded. Indicia angularly arranged on the connector end facilitate adjustment of the pin to provide upper or lower stress levels.

7 Claims, 1 Drawing Sheet

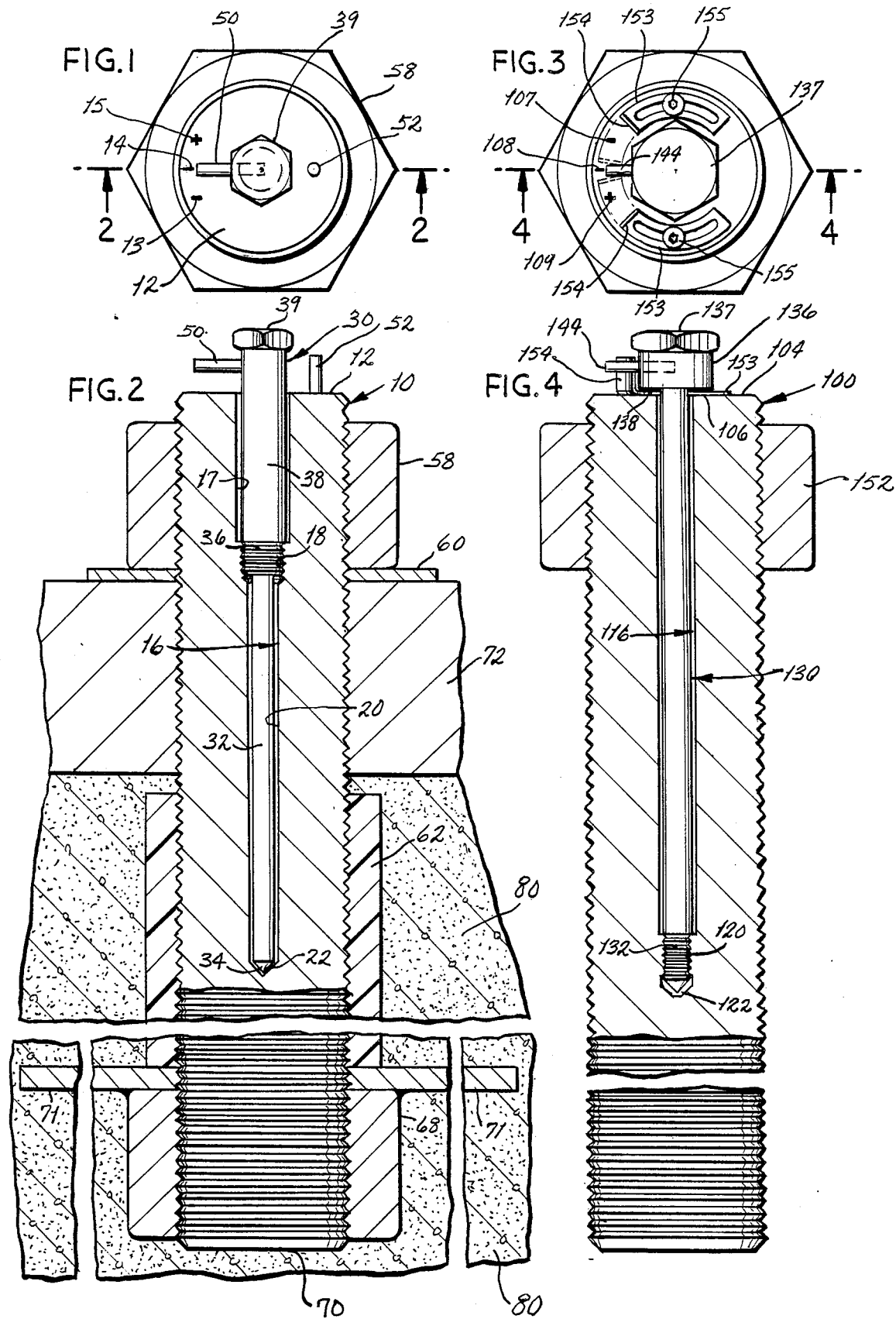

TENSION BOLT HAVING ADJUSTABLE STRESS LEVEL

BACKGROUND OF THE INVENTION

1. Field of the Invention

This invention relates to tension connectors of the type having means to indicate that a pre-determined tension stress has been reached. It has particular applicability to anchor bolts installed in foundations, as well as to other bolts which cannot be readily removed for substitution and replacement by a bolt set for a different stress level.

2. Description of the Related Art

Anchor bolts are typically installed deep in concrete foundations, with threaded ends projecting upwardly for securement of vibrating machinery to the foundation. Their use presents problems not adequately met by bolts heretofore available.

To hold down vibrating machinery at a plurality of support points, it is important that the bolts be placed in tension at a level that is never fully relaxed regardless of the range of stress reversals imposed by vibrations. It is obviously desirable that such bolts be provided with some indicator means which on installation can be checked to determine that a desired pre-tension has then been applied. However when subjected to actual operation, the bolts may require further tightening; and new factors, such as vibration levels, may bring about the decision to change the preliminarily chosen stress levels. Bolts shown in prior patents do not fill this need.

All relevant patents employ the principle that steel is an elastic material; when stress not exceeding its elastic limit is applied, it elongates proportionately to the load, and resumes its precise original length when the tension is removed.

U.S. Pat. No. 4,525,114 to Rotabolt Limited, shows a tension bolt having in its headed end an axial cavity of relatively large diameter, which terminates inwardly in a constricted portion in which the inner end of a headed pin is positively anchored so that it cannot turn. The head of the pin normally projects slightly beyond the bolt head. Under the pin's head is a washer which is rotatable when the bolt has not been elastically extended in tension. As a design tension stress is reached in the bolt, the bolt cavity is elastically elongated, clamping the washer between the heads of the pin and the end of the bolt.

U.S. Pat. No. 4,636,120 to The Babcock & Wilcox Company shows substantially the same concept, using both a flat washer and a cupped washer. The same general idea is shown in U.S. Pat. No. 3,881,392 to Illinois Tool Works, Inc.

If a need is present to tighten a bolt to a tension level which is adjustable, the foregoing constructions will not serve. For this more complex purpose, a very complicated apparatus is shown in U.S. Pat. No. 4,686,859 to SPS Technologies. That patent similarly employs a pin securely fastened in the bottom of an axial cavity, whose outer end is headed by a slender disc. Imposing tension lessens the space between the disc and the top surface of the bolt. This lessening is measured by a complex gaging device to determine the tension stress in the bolt.

Another patent using an external gaging device is U.S. Pat. No. 3,954,004 to Orner. In this patent a large diameter cavity is filled with an incompressible substance such as liquid or rubber. As the cavity is lengthened in tension, the pin is drawn downward. An external gage is provided to measure the pin displacement.

All these patents show the cavities to be formed in the headed ends of bolts, reflecting the thinking that loss of the cross-sectional area to the cavity is not as serious as if the cavity were formed in a threaded end of the bolt.

SUMMARY OF THE INVENTION

While the present invention is not limited to anchor bolt installations, its purposes and functions are best understood with reference to the installation of anchor bolts which tie down vibrating machines to concrete foundations. Typically in these installations, the lower end of the bolt is secured by a broad plate embedded deep within the concrete foundation. From this plate the bolt extends upward to project through a bore in the base of the machine to be installed. The upper end of the bolt (or normally its entire length) is threaded; this dictates that the axial cavity, provided in the upper bolt end, should be as small in diameter as possible. Since these bolts are set in the concrete foundation, they cannot be removed for substitution of a bolt of different stress level except by destroying part of the foundation.

In addition to solving the problem of how to make adjustments from preliminarily chosen stress levels of anchor bolts so permanently set in the foundations, another advantage afforded by the present invention is as follows: only a small stock of such bolts need be kept on hand, because chosen stress levels are adjustable over a substantial range. This is important, for the user may already be burdened with having to carry a stock of bolts of varying lengths and diameters.

In its preferred embodiment, the new connector utilizes a principle different from the prior constructions above described. The ratio of stress (in pounds per square inch) to strain (difference in length) of an elastic member such as steel, is known as its modulus of elasticity E. This modulus is substantially the same whether the strain is in tension or in compression. Uniquely in the preferred embodiment, release of the tensile elongation on the connector imposes the same amount of compressive shortening of the gaging pin.

In this embodiment the connector has a small diameter central gaging cavity, which extends inward from a larger diameter internally threaded bore portion adjacent to the connector end. Against the inner end of the gaging cavity sets the inner tip end of a slender gaging pin; its larger diameter threaded portion is mounted for angular adjustment within the internal threads of the connector. The pin's larger diameter portion extends outwardly of the connector end, where it serves as a manipulating portion and is equipped with a radially extending pointer. The angular position of the pin in its threaded mounting is shown by the relation of the pointer to angular indicia on the connector end.

An initial stress level for the bolt is set at the manufacturing plant; this is done by mounting the bolt on a fixture and applying tension to the chosen design stress level; by so doing the cavity is elastically lengthened. The gaging pin is then screwed downward until its tip engages the bottom surface of the cavity; the angular position of the pointer is then marked on the end of the connector. The connector is then released from tension; the cavity thus regains its original length but the gaging pin is elastically compressed. The connector may then be shipped to the user. In this embodiment the inner end of the cavity and the inner tip of the pin serves as gaging surfaces.

In a typical use, after the user has installed the opposite end of the tension connector in the foundation, he puts the machine in place over this and similar connectors, then bolts the machinery down, gradually increasing the tension on these connectors until their stress reaches the pre-set level. This tension elongates the cavity until the compression on the pin is fully released; this release permits the pin to be fully turned unrestrainedly in the direction of a lower stress level.

Assuming that stress level is then deemed satisfactory, nothing more need be done. However, if then it is decided to increase the design stress level, this may be done in the manner set forth hereafter.

In an alternate embodiment of this present invention, using a larger diameter central cavity much as in the prior art constructions, the inner end of the cavity inner end is equipped with threads in which the threaded tip end of the pin may be turned by the pin's manipulative portion. In this embodiment the connector end face and an overlaying surface of the pin manipulative portion serve as gaging surfaces.

BRIEF DESCRIPTION OF THE DRAWINGS

FIG. 1 is a top plan view of a bolt connector embodying the present invention.

FIG. 2 is a sectional view taken along line 2—2 of FIG. 1.

FIG. 3 is a top plan view of a modified embodiment of the invention. The phantom lines indicate the position of slotted arcuate members when so set that their tabs confine the gaging pin to a selected stress level.

FIG. 4 is a sectional view taken along line 4—4 of FIG. 3.

DESCRIPTION OF THE PREFERRED EMBODIMENTS

The externally threaded bolt connector of the present invention, generally designated 10, is of a chosen length of steel having, for example, a tensile strength of 140,000 psi. The upper end face of the connector 12 bears an indicia marking 14 which denotes a stress level chosen as the design stress level, as well as markings of an upper usable stress limit 15, marked with a plus sign, and a lower stress limit 13 deemed usable, marked with a minus sign. Within the connector 10, an axial cavity generally designated 16 is bored inward from the upper end face 12. The axial cavity 16 comprises a larger bore free portion 17, the depth of which generally coincides with the depth required for an exterior nut 58, and which terminates with internal threads 18; and below which is a narrower bore which extends downward from the internal threads 18 to form a gaging cavity portion 20. The elastic extension under design stress of this gaging cavity portion 20 provides the measure for fixing the stress level as hereafter described. The gaging cavity portion 20 terminates in a cavity bottom which serves as a connector gaging surface 22, and is tapered as shown.

A gaging pin generally designated 30 extends from the cavity bottom gaging surface 22 to above the upper end face of the connector 12. The gaging pin 30, like the connector 12, is preferably of steel, and in any event its elastic limit in compression should not be less than that of the connector in tension. The pin 30 has a long slender unthreaded portion 32 extending from the gaging surface 22, where the tapered tip pin gaging surface 34 makes full bearing contact with the connector gaging surface 22, to the cavity internal threads 18, to be engaged by external threads 36 on the pin 30. The gaging pin 30 has a larger diameter unstressed adjustment portion 38, which extends outward through and beyond the connector end face 12, to terminate in a wrenching head 39. A pointer 50, immediately below the wrenching head 39, extends radially outward above the connector upper end face 12.

An important aspect of the connector assembly is its stress level indicating means. These comprise the pointer 50 and the stress level indicia 13, 14, 15 on the connector end face 12. They are supplemented by an interfering pin 52 set into the connector upper end face 12 at a radial distance less than the extent of the pointer 50 and extending vertically above it; it confines the gaging pin to less than 180° movement to either side of the design stress level indicator 14.

In a typical installation, as shown in FIG. 2, a conventional upper nut 58 and washer 60 secure a machine base 72, and a plastic sleeve 62 sheaths the connector 10. The lower portion of FIG. 2 illustrates how the connector assembly is anchored within a foundation 80. Before casting the concrete foundation 80, the greater length of the connector 10 is sheathed in the plastic sleeve 62, and a lower nut 68, onto which is welded a large diameter steel plate 71, is screwed onto the lower end 70 of the anchor bolt connector 10. These are temporarily secured at a level desired so that the upper end of the anchor bolt 70 may project to the necessary height for securing the base 72 of a machine to be mounted; the concrete foundation 80 is then cast and permitted to harden. The connector 10 should be permitted to project only a minimum amount (say, two threads) above the upper nut 58; if screwed down substantially farther, the nut 58 will restrain elastic extension of the gaging cavity portion 20.

In this embodiment, the connector 10 has previously been extended in tension at the factory, and when the design tension load was reached, the gaging pin 30 was screwed down to contact the base of the cavity which serves as the connector gaging surface 22; the angular position of the pointer 50 then marked on the connector end face 12 as the design stress level indicator 14; and lower end upper usable level markings 13, 15 were also inscribed. The tension was then released.

The mechanical principle employed in this embodiment is that as the elastic elongation of the cavity gaging portion 20 was relaxed, the unthreaded portion 32 of the gaging pin 20 was compressed, shortening it to the same extent. Thereafter in the field, when the connector 10 is installed and the top nut 58 drawn tightly to exert the factory pre-set stress level, its original tensile elongation is recreated. This relieves the compression which shortened the pin 30; it elongates to its original length and becomes free of the cavity gaging surface 22. At this point, the pointer 50 will be free to turn toward the lower stress level indicator 14, or if a greater tensile stress than the design stress has been placed on the connector 10, the pin 20 may be turned to the higher level stress indicator 14.

In use, the tension stress level may be periodically rechecked, and increased or lowered if desired; in any event, freedom or restraint of the pin 20 signals whether such predetermined stress level has been reached or exceeded. This feature, being able to sense and adjust stress levels by angular movement, differentiates the invention from the prior art.

The angular range for setting the indicia will be a function of the length of the cavity and the pitch of the threads. It may be computed according to familiar principles of mechanical engineering as follows: taking the modulus of elasticity in tension for steel at 30,000,000 and assuming the chosen design tensile stress level is 60,000 psi, for a cavity only 3.5" long the cavity elongation at the design stress level is found as follows: 60,000/30,000,000=0.002".

Applied to the present construction if one chooses the pitch of the threads to be 36 per inch, or 0.0278", the slope per degree will be 0.0278/360=0.000077. The number of degrees of turn of the pin 20 to compensate for the elongation is then $$\frac{.002}{.000077} = 26°.$$

Assuming that the range of stress levels which may be chosen is from 20,000 psi below to 20,000 psi above the design level of 60,000 psi, the angular range between the low and high indicia 13, 15 will be $$\frac{2 \times 20,000 \times 26°}{60,000} \text{ or approximately } 18°.$$

If a greater angular range is deemed desirable, a proportionate increase in such range may be achieved by either increasing the length of the cavity gaging portion 20 or utilizing more threads per inch. Should the bolt connector 10 be of aluminum, whose modulus of elasticity is only one-third that of steel, the elongation per unit stress, and hence the angular range of movement between two stress levels will be three times as great; however, it is assumed that for aluminum, a lower stress level would be chosen.

In the foregoing illustration, the diameter of the pin unthreaded gaging portion 32 was chosen as 0.200 inches; the diameter of the relatively slender cavity gaging portion 20 was only slightly greater. Thus in this embodiment of invention, the cross-sectional area of the upper connector 10 portion is not substantially diminished—not more than say 4%. In this respect, this embodiment is to be preferred over the other embodiment, hereafter described, as well as over the prior art.

A second embodiment of the present invention, illustrated in FIGS. 3 and 4, is an externally threaded tension bolt connector, generally designated 100, similarly formed of steel. The connector upper end face 104 is cut flat; its radially inward portion serves as the connector gaging surface 106. The connector upper end surface 104, on its radially outward portion, bears indicia markings 108 which denote a stress level chosen as the design stress level, as well as selected upper and lower stress limits. An upper nut 152 is used to apply tension after the connector 100 has been installed as in the first-described embodiment.

An axial gaging cavity generally designated 116 is bored inward from the connector gaging surface 106 and terminates in internal threads 120 near the cavity bottom 122. The elastic extension of the portion of this cavity 116 outward of its threads 120 provides the measure for fixing stress levels, as hereafter described. Note, however, that the external nut 152 restrains the extension of the upper part of the cavity 116.

A pin generally designated 130 has at its lower end external threads 132, which engage the cavity internal threads 120. The pin 130 extends outward to above the connector gaging surface 106, where it has a larger diameter pin adjustment portion 136 with a wrenching head 137. The adjustment portion flat underface 138 serves as the pin gaging surface, and fits flush with and functionally engages the connector gaging surface 106 when the connector 100 is placed in tension at a preselected stress level. A pointer 144 immediately below the wrenching head 137 extends radially outward above the connector upper end face 104.

The stress level indicating means here utilized comprise the pointer 144 and the stress level indicia 107, 108, 109 on the connector end face 104, previously marked thereon at the factory, as hereinafter set forth. A pair of slotted arcuate members 153 bearing upstanding tabs or projections 154 are so mounted on the end face 104 by set screws 155 as to be angularly adjustable. They limit the range of movement of the pointer and preferably are adjusted to confine it at a fixed stress level.

In this embodiment the connector 100 has, at the factory, been placed in tension at the design stress level. At this stress level, the length of the cavity 116 has been elongated and the gaging pin 130 turned until its underface 138 is drawn into full bearing contact with the connector gaging surface 106 at the outer connector end 104. Further, the position of the pointer 144 relative to the connector end surface 104 has been marked on it with the central indicia marking 108; optionally the angularly adjustable confining projections 154 have been fixed to confine the pointer 144 to this position, and the tension has then been released. In contrast to the first embodiment, in this embodiment, while the connector 100 was elastically extended at the factory, the gaging pin 130 is not ever subjected to substantial compression or elongation.

Thereafter when in the field the connector 100 is installed and tension applied to the design stress level, bearing contact between the connector gaging surface 106 and the pin underface 138 is made with consequent restraint from angular movement. Before the tension stress level is selected the chosen level may be easily adjusted by turning to a newly selected stress level, first loosening the nut 152, confining projections 54 if previously set against the pointer 144. These confining projections 154 may again be set to maintain the pin at the chosen angular position, not to be disturbed by external forces as vibrations, etc.

One reason for setting the confining projections 154 against the pointer 144 at the factory is that here, unlike the first described embodiment, prior to installation the position of the gaging pin 130 is not fixed; it is free to turn before the connector 100 has been extended in tension. However, there is this offsetting advantage: prior to installation the design stress level may be easily re-adjusted so that if there are varying stress level requirements, a smaller stock of connectors need be kept on hand.

Throughout this application the terms "bearing" and "bearing contact" are used in the adjective sense of withstanding thrust; it is to be understood that such thrust-withstanding here prevents, rather than permits, relative sliding movement.

As various modifications may be made in the constructions herein described and illustrated without departing from the scope of the invention, it is intended that all matter contained in the foregoing description or shown in the accompanying drawings shall be interpreted as illustrative rather than limiting.

We claim:

1. An adjustable stress-level indicating tension bolt connector assembly comprising a metal tension bolt connector having external threads over at least a portion of its length, further having
   A. an axial cavity within a portion of the length of said tension bolt connector and extending inward from an end face of said connector, said cavity including
      a gaging portion terminating at one end in internal threads and having opposite thereto a connector gaging surface,
   B. a gaging pin having external threads adjustably engaging the internal threads of said cavity gaging portion,
      an unthreaded pin portion extending from said pin external threads at least to the opposite end of said gaging cavity portion and then having a pin gaging surface, and
      an unstressed adjustment portion extending outwardly beyond said tension bolt connector end face, and
   C. adjustable stress level indicating means provided by angular positioning of said adjustment portion relative to said tension bolt connector end face,
   whereby, after the connector has been elastically extended to a previously set stress level and the pin so turned in said threads that its gaging surface bears against the connector gaging surface, on re-application of tensile stress, freedom or restraint of said gaging pin signals whether such pre-set stress level has been reached or exceeded.

2. An adjustable stress-level indicating tension bolt connector assembly as in claim 1, wherein
   said axial cavity gaging portion continues inwardly from its internal threads to terminate in a cavity bottom surface, and
   said external threads of said gaging pin are spaced inwardly from said end face of said connector, and its unthreaded pin portion continues inwardly from its external threads to a tip presentable against said cavity bottom surface.

3. An adjustable stress-level indicating tension bolt connector assembly as in claim 1, wherein
   the end of the cavity gaging portion having said internal threads is its inner end, and
   said connector gaging surface is the radially inward portion of said connector end face, and wherein
   said external threads of the gaging pin are at its inner tip end, and
   the unthreaded pin portion continues from said external threads outwardly beyond the connector end face to a larger diameter pin adjustment portion having an underface,
   whereby said underface serves as said pin gaging surface.

4. An adjustable stress-level indicating tension bolt connector assembly as in claim 2, wherein
   both the tension bolt connector and the gaging pin are steel, and the elastic limit of the gaging pin is not less than that of the tension bolt connector.

5. An adjustable stress-level indicating tension bolt connector assembly as defined in claim 1, in which the stress-level indicating means comprises
   stress-level indicia denoted on said tension bolt connector and
   a pointer projecting radially from the outwardly extending adjustment portion of said gaging pin.

6. An adjustable stress level indicating tension bolt connector as defined in claim 5, in combination with
   an interfering vertical projection extending from the end face of said tension bolt connector end at radial distance less than the extension of said pointer,
   whereby said vertical projection confines angular movement of said gaging pin to less than a single turn.

7. An adjustable stress-indicating tension bolt connector as defined in claim 1, together with
   adjustable means to restrict the pin from angular movement.

* * * * *